United States Patent [19]

Blumenthal

[11] Patent Number: 4,986,647
[45] Date of Patent: Jan. 22, 1991

[54] DECORATION FOR SPECTACLE FRAMES OF PLASTICS MATERIAL AND A METHOD FOR ITS APPLICATION

[75] Inventor: Oreste Blumenthal, Turin, Italy

[73] Assignee: Giuseppe Ratti Industria Ottica S.p.A., Turin, Italy

[21] Appl. No.: 292,153

[22] Filed: Dec. 30, 1988

[30] Foreign Application Priority Data

May 25, 1988 [IT] Italy .................. 67483 A/88

[51] Int. Cl.⁵ .............. G02C 11/02; G02C 1/08; G02C 5/22
[52] U.S. Cl. .................... 351/51; 351/121; 351/153
[58] Field of Search ............ 351/51, 52, 153, 121; 16/228

[56] References Cited

U.S. PATENT DOCUMENTS 2,326,971 8/1943 Rey ...................... 351/153

FOREIGN PATENT DOCUMENTS 838194  6/1960 United Kingdom ........ 351/153
974380 11/1964 United Kingdom ........ 351/153
1121551 7/1968 United Kingdom ........ 351/153

*Primary Examiner*—Rodney B. Bovernick
*Attorney, Agent, or Firm*—Sughrue, Mion, Zinn, Macpeak & Seas

[57] ABSTRACT

A decoration for spectacle frames of plastics material is formed by a shaped plate intended to be incorporated in a zone of a frame so as to appear on the surface with its outer face substantially flush with this zone. The plate has at least one passage formed within its thickness in the form of one or more longitudinal, transverse or oblique grooves or apertures inscribed in the plate and opening onto its outer face so as to be occupied by the plastics material constituting the frame itself during application to the frame.

11 Claims, 6 Drawing Sheets

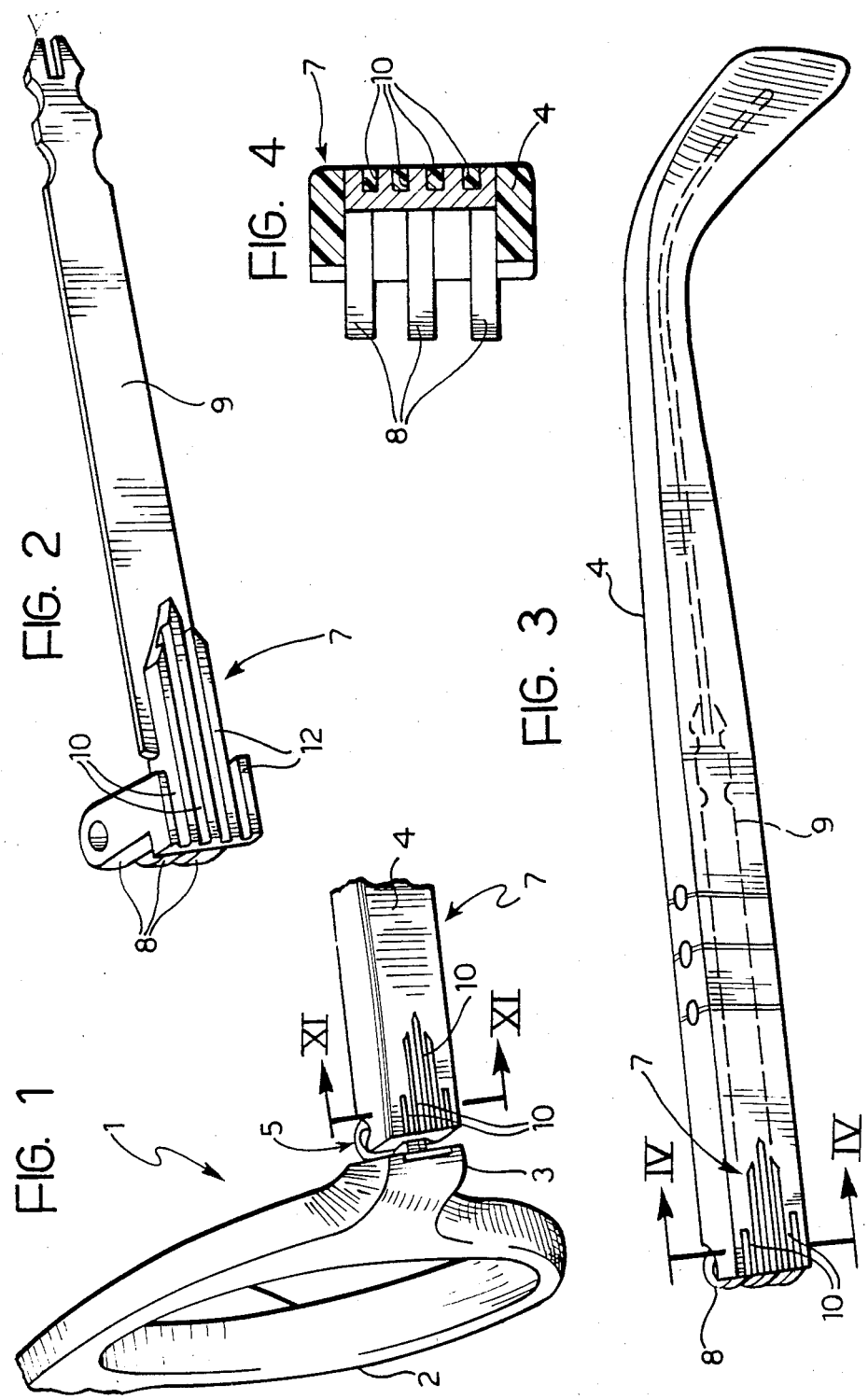

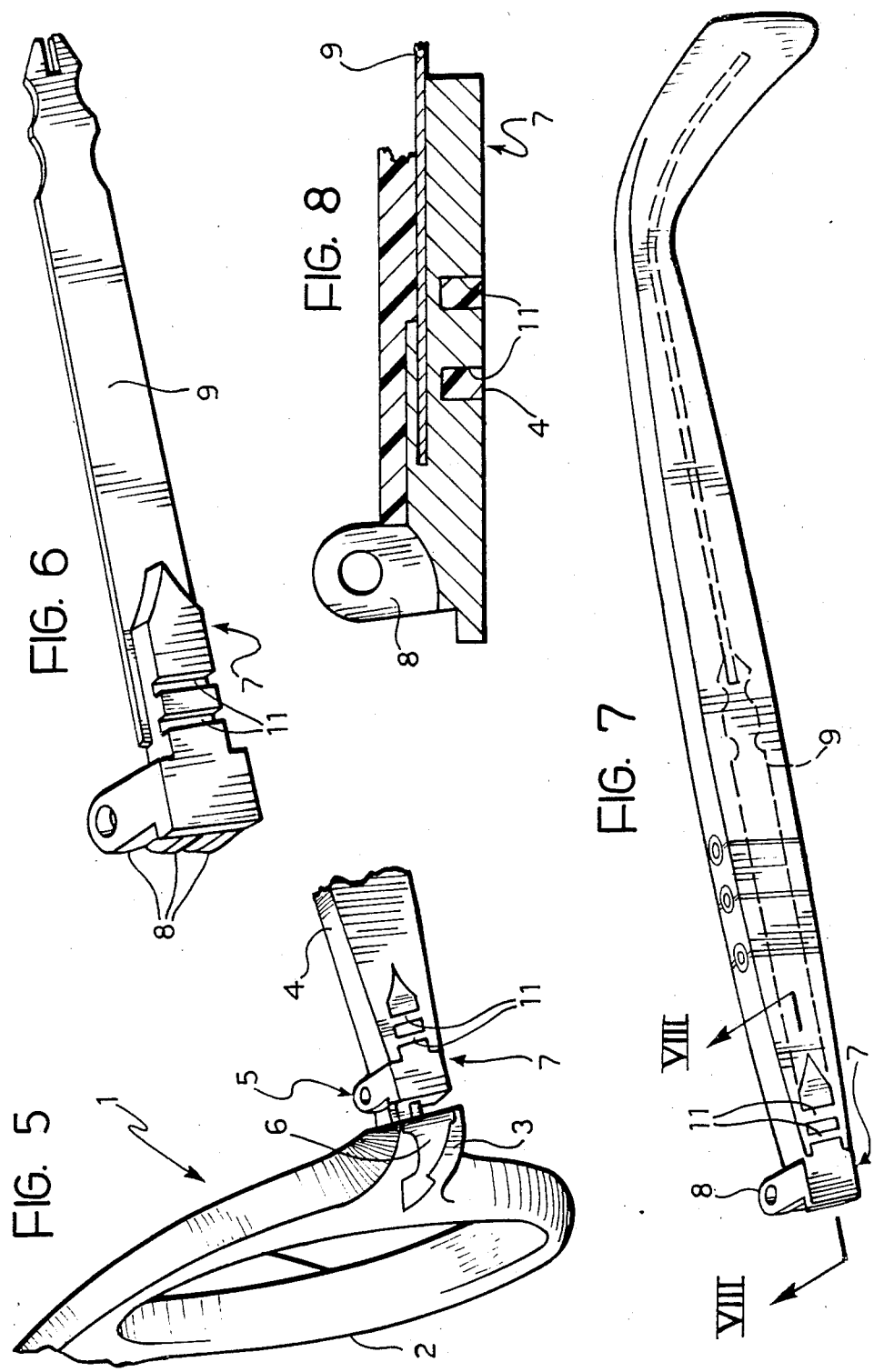

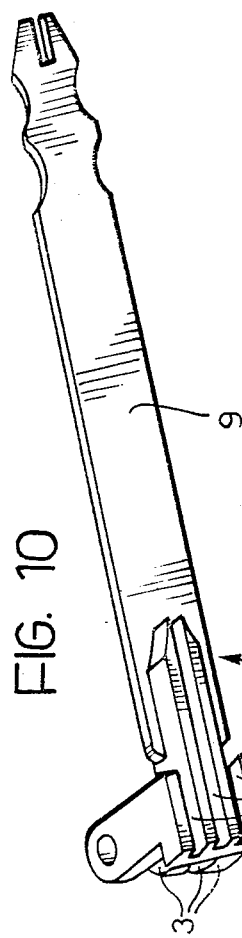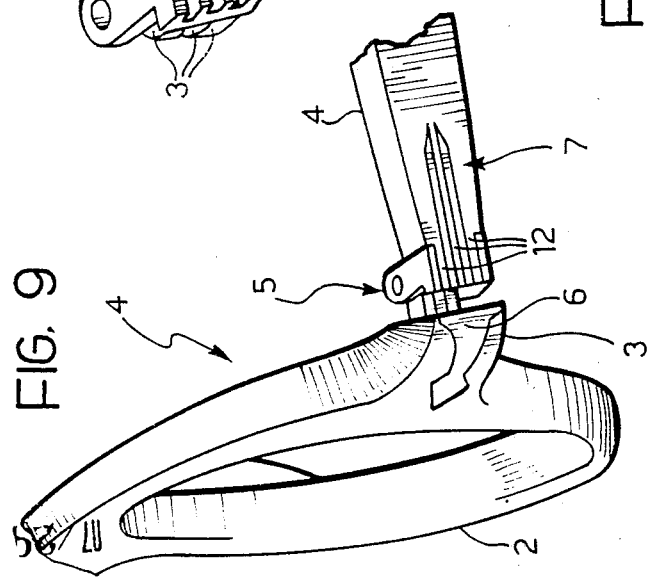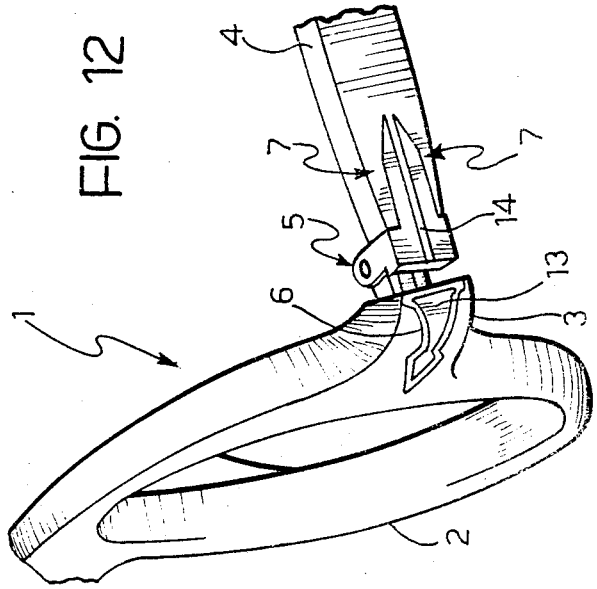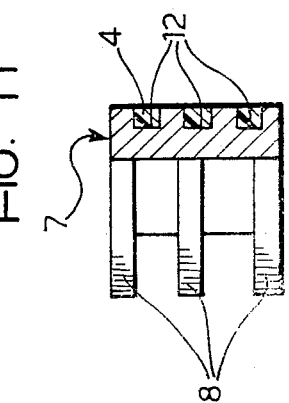

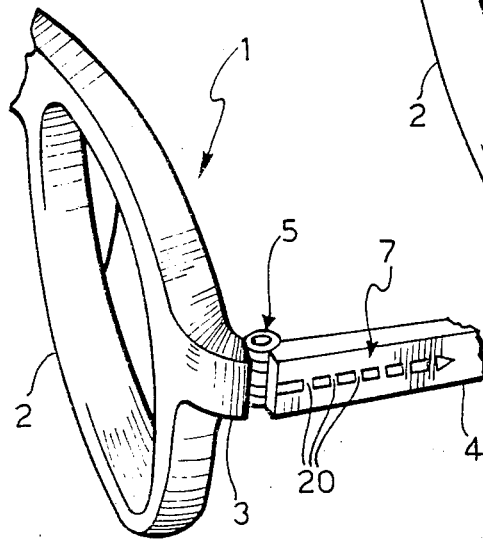
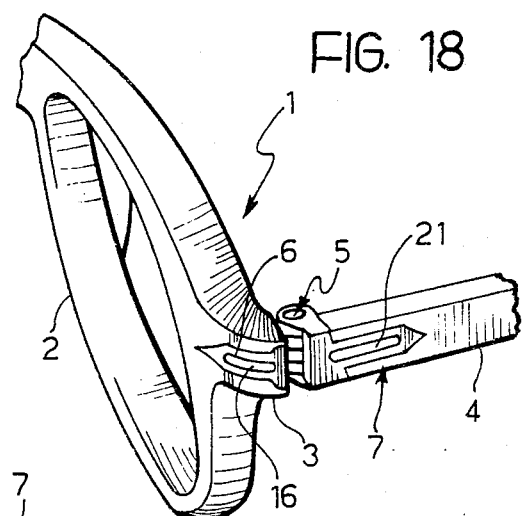
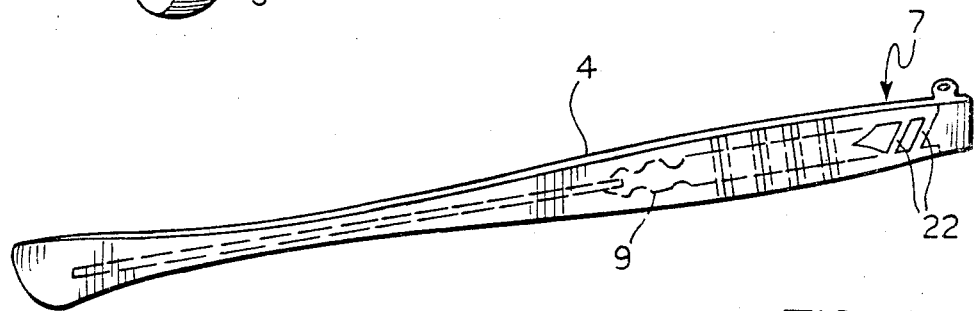
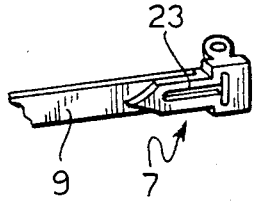
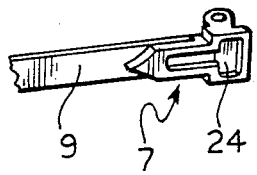
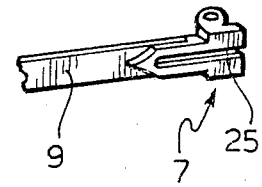

DECORATION FOR SPECTACLE FRAMES OF PLASTICS MATERIAL AND A METHOD FOR ITS APPLICATION

BACKGROUND OF THE INVENTION

The present invention relates to spectacle frames of plastics material, in general. This term is intended to include both high-quality frames made from sheet and poorer quality ones made be injection moulding or other methods.

More particularly, the invention provides a decoration for frames of the type defined above, comprising a shaped plate intended to e incorporated in a zone of the frame so as to appear at the surface, with its outer face substantially flush with this zone.

These decorations, which may be of metal or other material and may have various configurations, are generally applied to those ends of the side pieces which are articulated to the front piece of the frame, to the appendages (usually called "noses") at the sides of the front piece to which the side pieces are articulated, or even to the bridge of the front piece. Their purpose is mainly aesthetic and ornamental but sometimes functional, such as when the decoration constitutes part of a hinge element for articulating the side pieces to the front piece. In some cases, the decoration also has a dominant function of being distinctive when its shape is so characteristic as to identify the producer immediately. This is the case for decorations applied to the frames sold by the Applicant, which have a characteristic arrow shape protected by national and foreign trade marks.

SUMMARY OF THE INVENTION

The object of the present invention is to provide a decoration of the type defined above, which is shaped so as to improve its aesthetic and decorative appearance when applied to the frame, and also contributes to an increase in its functional efficiency in cases in which it is also used for utilitarian functions (for example, as a component of the hinge articulating the side pieces to the front piece).

According to the invention, this object is achieved by virtue of the fact that the plate constituting the decoration has at least one passage formed within its thickness and opening onto the outer face so as to be occupied by the plastics material constituting the frame itself during application of the plate to the frame.

By virtue of this solution, the decoration according to the invention consequently has an original decorative effect resulting from the copenetration of the plastics material constituting the frame in the form of an inlay within the or each passage formed within the plate. This copenetration may also improve the anchorage of the decoration to the frame with obvious structural advantages, particularly when the decoration is used for functional purposes as well as for aesthetic and distinguishing purposes.

The at least one passage formed in the decoration for the copenetration of the material of the frame may be constituted by a longitudinal groove, by a plurality of parallel longitudinal grooves which are normally open in correspondence with at least one end of the plate, by a transverse groove or plurality of parallel transverse grooves, or even by at least one oblique groove or a plurality of parallel oblique grooves.

The at least one passage may also be constituted by an aperture, either a through aperture or a simple recess inscribed in the plate with a geometric or fancy shape, or by notches or impressions of various shapes.

A further subject of the invention is a method for the application of a decoration as defined above to a spectacle frame of plastics material. The method consists of the insertion of the plate so that it appears on the surface of the plastics material constituting the frame, this material being made to occupy the at least one passage in the plate.

The method according to the invention can be applied both to high-quality frames made from sheets, in which case the decoration is applied by the preheating of the material of the frame and of the plate and the subsequent setting of the latter in place by its end—on or side—on incorporation in the plastics material, and to less-expensive frames made by injection moulding. In the latter case, the plate is inserted in the mould and incorporated in the plastics material during its injection.

In both cases, an inlay effect is achieved between the plate constituting the decoration and the zone of the frame to which it is applied, as a result of the copenetration of the plastics material into the or each passage in the plate itself. These inlays may have different colours and compositions according to the characteristics of the decoration and of the plastics material constituting the frame.

BRIEF DESCRIPTION OF THE DRAWINGS

The invention will now be described in detail with reference to the appended drawings, provided purely by way of non-limiting example, in which:

FIG. 1 is a schematic perspective view of part of a spectacle frame provided with a decoration according to a first embodiment of the invention, FIG. 2 is a perspective view of the decoration of FIG. 1 on an enlarged scale, FIG. 3 is a perspective view of the side piece of the frame of FIG. 1, FIG. 4 is a cross-section taken on the line IV—IV of FIG. 3, on an enlarged scale, FIG. 5 shows a first variant of FIG. 1, FIG. 6 is a perspective view of the decoration of the frame of FIG. 5, on an enlarged scale, FIG. 7 is a perspective view of the side piece of the frame of FIG. 5, on an enlarged scale, FIG. 8 is a cross-section taken on the line VIII—VIII of FIG. 7, on an enlarged scale, FIG. 9 shows a second variant of FIG. 1, FIG. 10 is a perspective view of the decoration of the frame of FIG. 9, on an enlarged scale, FIG. 11 is a cross-section taken on the line XI—XI of FIG. 9, on an enlarged scale, FIG. 12 shows a third variant of FIG. 1, FIGS. 13–18 show a further six variants of FIG. 1, FIG. 19 shows a variant of FIG. 3, FIGS. 20, 21 and 22 shows a further three variants of the decoration of FIG. 2, and FIGS. 23 to 26 are schematic front elevational views of further variants of the decoration according to the invention.

DETAILED DESCRIPTION OF THE INVENTION

Figure 13:
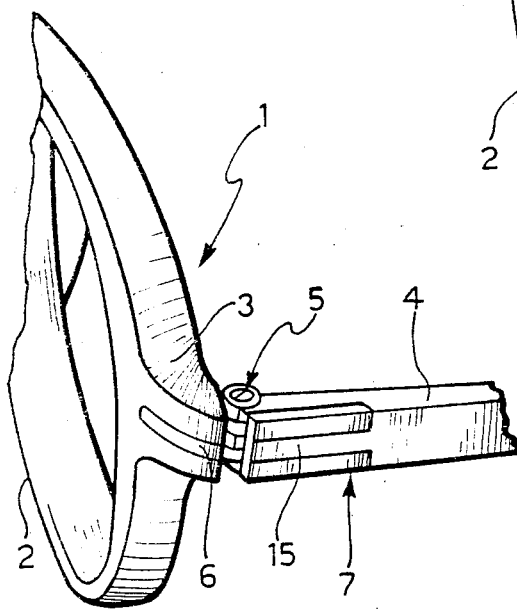

With reference initially to FIG. 1, part of a spectacle frame of thermoplastics material is generally indicated 1. The frame comprises, in the usual manner, a front piece 2 having side appendages 3 termed "noses" (only one of which is shown in the drawing) to each of which is articulated a side piece 4. The articulation is formed by a hinge, generally indicated 5: respective decorations 6, 7 incorporated in the plastics material constituting the frame 1 are associated with the hinge elements carried by the nose 3 and the corresponding end of the side piece 4.

More particularly, as illustrated in greater detail in FIGS. 2 and 3, the decoration 7 applied to the side piece 4 is constituted by a shaped plate from which hinge eyelets or cradles 8 project laterally and a core 9 projects longitudinally to constitute the reinforcing core of the side piece 4.

In the case shown in FIGS. 1 to 4, the plate constituting the decoration 7 is of metal and has the general shape of an arrow with pointed distal ends. It should however be noted that the plate 7 could be of a different material, for example, plastics material, and, as will be seen below, may have profiles different from that of an arrow.

According to the invention, the outer face of the plate 7 has one or more passages the function of which will be clarified below. In the embodiment of FIGS. 1 to 4, the passages are constituted by a series of four parallel longitudinal grooves 10 of which the two central ones extend through the entire length of the plate 7 and the two side ones have a shorter length.

When applied to the side piece 4, the decoration 7 is disposed so as to appear at the outer surface of the side piece 4, substantially flush therewith. The four grooves 10 are occupied by the plastics material of the side piece 4, giving an inlay effect which, as well as improving the aesthetic appearance, also improves the joining of the plate 7 to the side piece 4.

The method by which the plate 7 is applied to obtain the inlay effect may vary in dependence on the structure of the frame 1. Thus, for example, when the frame 1 is formed from a sheet, the decoration 7 may be applied during the step in which the core of the side piece 4 is inserted, that is, during the insertion of the core 9 and the hinge 5. This is achieved by the preheating of the side piece 4 and the core 9 with the plate 7 and their subsequent insertion end-on into the body of the side piece 4.

Alternatively, the plate 7 may be incorporated after the insertion of the core, in a manner identical to that described above: in this case the plate 7 may be inserted end-on or side-on.

When the side piece 7 is constituted by two sheets coupled together by gluing or welding, the core 9 carrying the plate 7 may be inserted together with a hinge 5 during the joining of the two sheets. When the frame 1 is made by injection moulding of a thermoplastics material, however, the plate 7 (with or without the core 9), is to advantage inserted directly into the mould before the injection, by insertion after moulding, or by other alternative methods. During the insertion of the core, the thermoplastics material covers the decoration and penetrates the various grooves. Subsequently, whatever the method, the surplus material is removed by smoothing.

As stated above, the decoration 7 may have different forms and configurations from that described with reference to FIGS. 1 to 4, particularly with regard to the passages followed by the plastics material during application to the frame 1. Moreover, as will also be seen below, the invention is not limited solely to decorations applied to the side pieces 4: in fact, the invention also envisages application to the noses 3 or other parts of the front piece 2, for example, in correspondence with the nose bridge.

Some of these possible variants will be described with reference to FIGS. 5 to 26.

In the case of FIGS. 5 to 8, in which parts identical or similar to those described above are indicated by the same reference numerals, the passages with which the decoration 7 is provided are constituted by two transverse grooves 11 which open onto the longitudinal edges of the plate. The ways in which the plate is incorporated in the side piece 4 are entirely identical to those described above.

According to the variant shown in FIGS. 9 to 11, the plate 7 has three longitudinal grooves 12 of which the two outer ones are of shorter length. As in the embodiment of FIGS. 1 to 4, the grooves 12 are open at both their ends. In an alternative embodiment, not shown, these grooves could however be closed at one of their ends or at both ends.

In the embodiment of FIG. 12, the plate 7 has a single longitudinal groove 14 similar to the central groove 10 of FIGS. 1 to 4 and open at both ends. The decoration 6 applied to the nose 3 of the portal 2 also has an aperture 13 occupied by the plastics material constituting the frame.

The decoration 7 of FIG. 13, instead of being pointed as in the previous embodiments described, has a generally rectangular shape with a single central longitudinal groove 15, again open at both ends.

Figure 14:
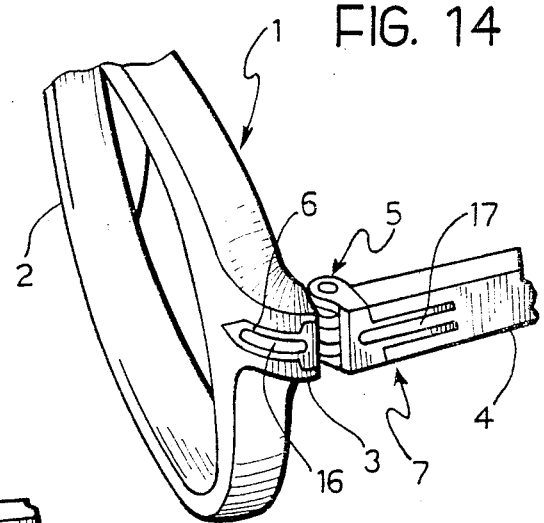

FIG. 14 shows another case in which, in addition to the decoration 7 applied to the side piece 4, the decoration 6 applied to the nose 3 of the front piece 2 also has a passage occupied by the plastics material constituting the frame 1. This passage, indicated 16, is constituted by a longitudinal groove closed at both ends, or by an aperture inscribed in the plate 6.

The plate 7 incorporated in the side piece 4, however, is provided with a central longitudinal groove 17 closed at its end facing the nose 3 and open at its opposite end.

Figure 15:
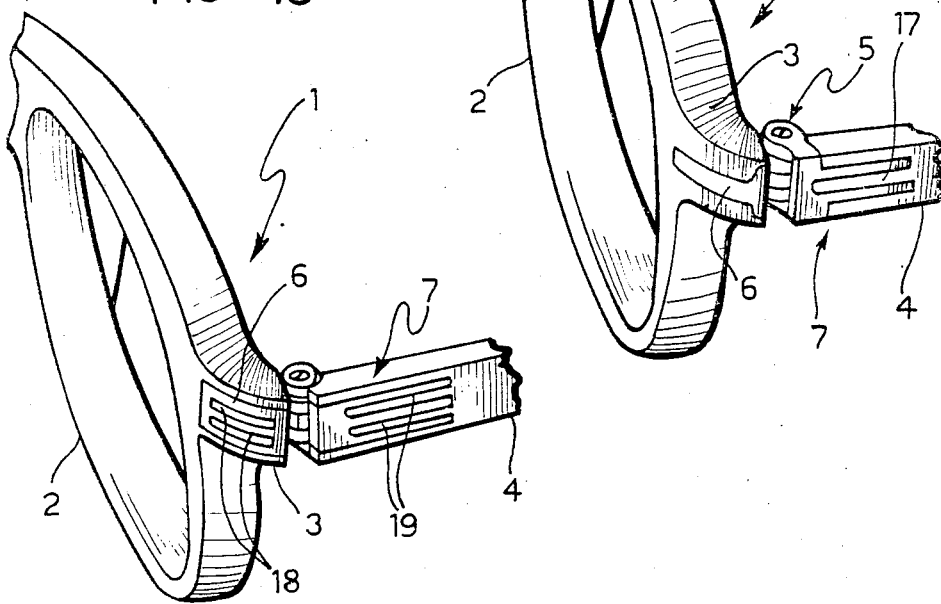

Again in the case of FIG. 15, both the plate 6 and the plate 7 have respective passages occupied by the plastics material. Both the plates 6 and 7 are generally rectangular and have two longitudinal grooves 18, 19 respectively. The grooves 18 of the plate 6 are closed at both ends and thus define two apertures inscribed in the plate, while the grooves 19 are open at their ends opposite the nose 3.

Figure 16:
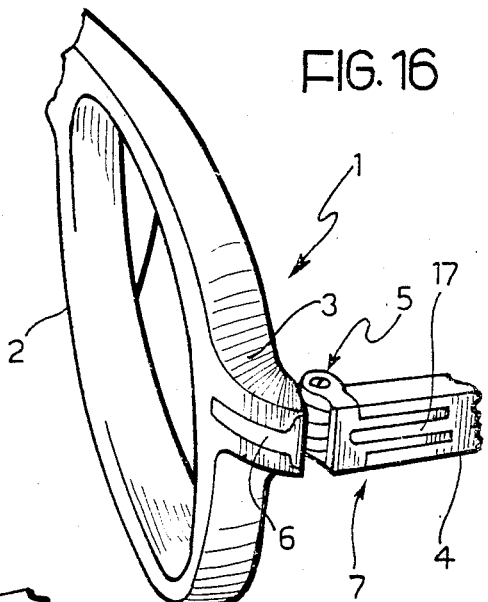
Figure 23:
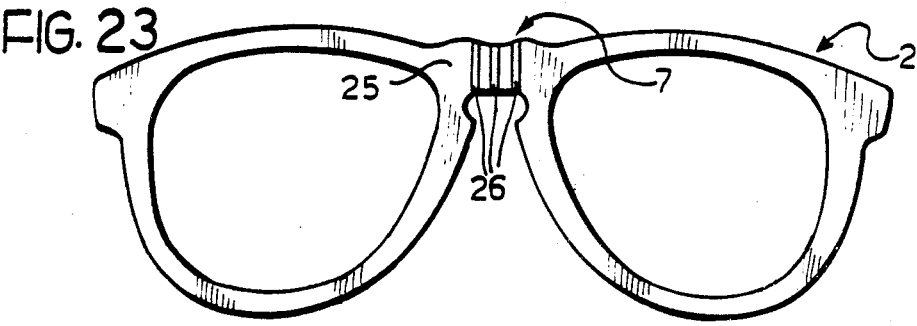
Figure 24:
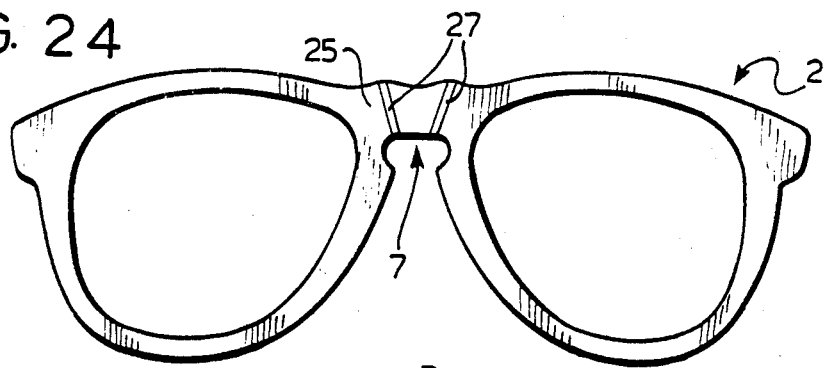
Figure 25:
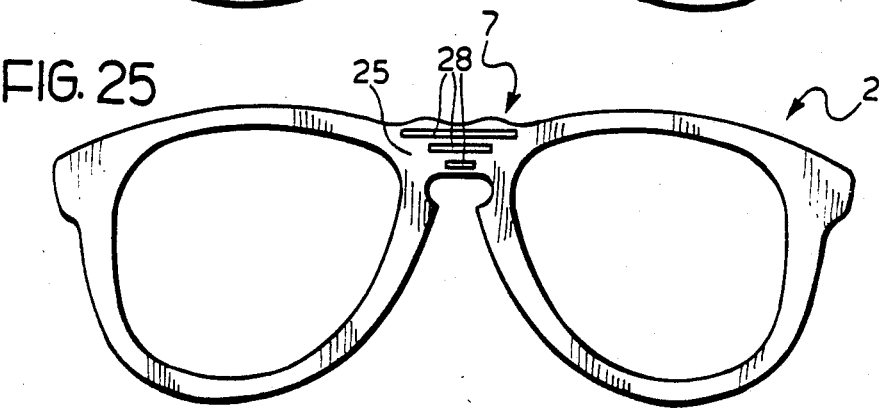
Figure 26:
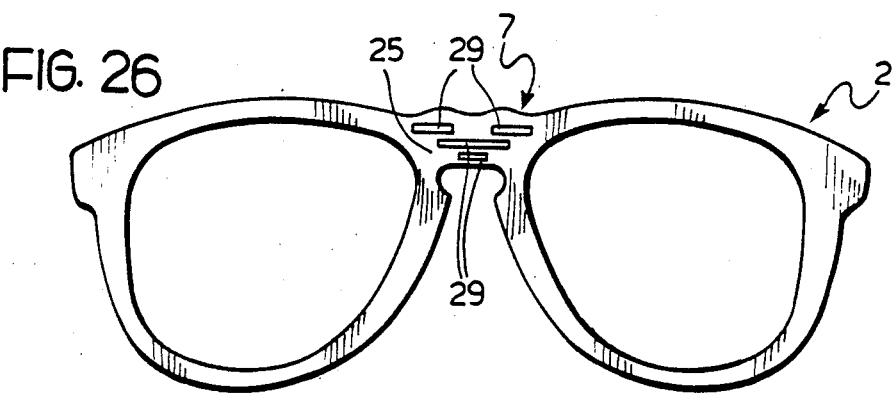

In the case of FIG. 16, the plate 7 is similar to that of FIG. 14, with a single longitudinal central groove closed at the end nearest the nose 3, while the decoration 6 applied to the nose 3 does not have cut-out portions.

According to the variant of FIG. 17, the decoration 7 has a generally thin shape and extends along the median zone of the side piece 4. This decoration 7 has a plurality of transverse grooves 20 occupied by the plastics material of the side piece 4 and arranged to give the decoration the general appearance of a broken line.

In the case of FIG. 18, the decoration 6 incorporated in the nose 3 is identical to that shown in FIG. 14, with a longitudinal aperture 16. The decoration 7 incorporated in the side piece 4 has a like configuration with a central longitudinal aperture 21 closed at both ends.

According to the embodiment illustrated in FIG. 19, the decoration applied to the side piece 4 has a generally pointed shape with a pair of oblique diagonal grooves 22. Naturally, the number of oblique grooves could vary from that shown.

In FIGS. 20, 21 and 22, the decoration 7 intended to be incorporated in the side piece 4 with the core 9 has a T-shaped aperture 23, 24 and a central longitudinal groove 25 closed towards the pointed end of the decoration and open at its opposite end.

Finally, FIGS. 23 to 26 show respective examples of the decoration 7 applied to the nose bridge 25 of the front piece 2 and forming passages 26, 27, 28 and 29, which are vertical, oblique and horizontal respectively, into which the plastics material forming the nose bridge 25 penetrates.

Naturally, decorations with forms, dimensions and configurations of the passages for copenetration of the plastics material of the frame 1 other than those described fall within the scope of the present invention.

What is claimed is:

1. A spectacle frame of plastic material having at least one decorative member embedded therein, said spectacle frame comprising a front piece and two side pieces connected to said front piece and each decorative member comprising a shape plate incorporated in at least one of said pieces with an outer face substantially flush with an external surface of said at least one piece, wherein said plate has at least one passage formed therein and opening onto said outer face with each passage filled with the plastic material constituting the frame.

2. A spectacle frame according to claim 1, wherein the plate has at least one longitudinal groove in its outer face.

3. A spectacle frame according to claim 1, wherein the plate has a plurality of parallel longitudinal grooves in its outer face.

4. A spectacle frame according to claim 2, wherein said longitudinal groove is open in correspondence with at least one end of the plate.

5. A spectacle frame according to claim 1, wherein the plate has at least one transverse groove in its outer face.

6. A spectacle frame according to claim 1, wherein the plate has a plurality of parallel transverse grooves in its outer face.

7. A spectacle frame according to claim 1, wherein the plate has at least one oblique groove in its outer face.

8. A spectacle frame according to claim 1, wherein the plate has a plurality of parallel oblique grooves in its outer face.

9. A spectacle frame according to claim 1, wherein the passage is constituted by an aperture inscribed in the plate.

10. A spectacle frame according to claim 1, wherein the plate forms part of a hinge member connected to said frame for articulating the side pieces to the front piece of the frame.

11. A method for the application of a decoration comprising a shaped plate to a spectacle frame of plastic material, said method including the steps of providing the plate with at least one passage formed within its thickness and opening onto an outer face of said plate, incorporating the plate in the frame so that it appears at an external surface of the plastic material constituting the frame, with said outer face substantially flush with the said surface, and making the material of the frame occupy the at least passage in the plate.

* * * * *